US010291629B2

(12) United States Patent
Allen et al.

(10) Patent No.: US 10,291,629 B2
(45) Date of Patent: *May 14, 2019

(54) COGNITIVE DETECTION OF MALICIOUS DOCUMENTS

(71) Applicant: International Business Machines Corporation, Armonk, NY (US)

(72) Inventors: Corville O. Allen, Morrisville, NC (US); Andrew R. Freed, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 47 days.

This patent is subject to a terminal disclaimer.

(21) Appl. No.: 14/859,261

(22) Filed: Sep. 19, 2015

(65) Prior Publication Data

US 2016/0134649 A1    May 12, 2016

Related U.S. Application Data

(63) Continuation of application No. 14/535,761, filed on Nov. 7, 2014.

(51) Int. Cl.
  *H04L 29/06* (2006.01)
  *G06F 17/27* (2006.01)

(52) U.S. Cl.
  CPC ........ *H04L 63/1416* (2013.01); *G06F 17/274* (2013.01); *G06F 17/2785* (2013.01); *H04L 63/1483* (2013.01)

(58) Field of Classification Search
  CPC ..................................................... G06F 17/27
  See application file for complete search history.

(56) References Cited

U.S. PATENT DOCUMENTS

| | | | |
|---|---|---|---|
| 7,487,544 B2 | 2/2009 | Schultz et al. | |
| 7,533,113 B1 * | 5/2009 | Haddad | G06Q 30/02 |
| 7,860,885 B2 | 12/2010 | Chow et al. | |
| 8,443,447 B1 | 5/2013 | Chen et al. | |
| 8,806,622 B2 * | 8/2014 | Waterson | G06F 21/56 |
| | | | 726/22 |
| 9,306,974 B1 * | 4/2016 | Aziz et al. | G06F 17/00 |
| 9,356,941 B1 | 5/2016 | Kislyuk et al. | |
| 2006/0253581 A1 * | 11/2006 | Dixon | G06F 17/30861 |
| | | | 709/225 |

(Continued)

OTHER PUBLICATIONS

Stone, "EBIDS-SENLP: A System to Detect Social Engineering Email Using Natural Language Processing," Thesis Paper, University of Maryland Baltimore County, May 2007, 45 pages.

(Continued)

*Primary Examiner* — James J Debrow
(74) *Attorney, Agent, or Firm* — Van Leeuwen & Van Leeuwen; Diana R Gerhardt (57) ABSTRACT

An approach is provided in which a knowledge manager identifies document command statements in a document that correspond to requests included in the document. The knowledge manager compares the document command statements against promise structures corresponding to promises included in valid documents and generates a suspicion score based on the analysis. In turn, the knowledge manager generates a suspicious document notification corresponding to the document when the suspicion score reaches a suspicion threshold.

5 Claims, 8 Drawing Sheets

(56) References Cited

U.S. PATENT DOCUMENTS

| | | | |
|---|---|---|---|
| 2010/0115621 A1* | 5/2010 | Staniford | H04L 63/1416 726/25 |
| 2010/0241844 A1* | 9/2010 | Hussain | G06F 21/6218 713/150 |
| 2011/0277024 A1* | 11/2011 | Begley | H04L 63/08 726/7 |
| 2013/0042302 A1 | 2/2013 | Chow et al. | |
| 2014/0070947 A1 | 3/2014 | Ionson | |
| 2014/0331119 A1 | 11/2014 | Dixon et al. | |

OTHER PUBLICATIONS

Levinson, "How to Tell if an Email is a Phising Scam," CXO Media Inc., Apr. 10, 2012, 4 pages.
"Cognitive Security Analytics Company SparkCognition Launches With Support from Leading Investors," PRWeb, Apr. 15, 2014, 2 pages.
Udell, "SpamBayes knows spam," InfoWorld, May 2003, 3 pages.
Allen et al., "Cognitive Detection of Malicious Documents," U.S. Appl. No. 14/535,761, filed Nov. 7, 2014, 40 pages.
"List of IBM Patents or Patent Applications Treated as Related," Letter from Leslie A. Van Leeuwen, Sep. 19, 2015, 1 page.

\* cited by examiner

COGNITIVE DETECTION OF MALICIOUS DOCUMENTS

BACKGROUND

"Phishing" refers to an act of a human or a computer system that attempts to obtain sensitive information from unknowing victims. Phishers traditionally send an official-looking malicious document (e.g., e-mail message, text message, etc.) to a potential victim pretending to be part of the potential victim's bank or retail establishment. The email may request the potential victim to respond with sensitive information, or click on a website link to a location where the potential victim enters sensitive information such as credit card numbers, social security numbers, passwords, birth dates, etc. The malicious documents have an increasing level of sophistication with the intention of tricking a user into clicking a link, downloading an executable program, or responding to some call to action and providing personal details. As such, the ability to detect authentic looking malicious documents is becoming more difficult using traditional spam checking and virus checking techniques.

BRIEF SUMMARY

According to one embodiment of the present disclosure, an approach is provided in which a knowledge manager identifies document command statements in a document that correspond to requests included in the document. The knowledge manager compares the document command statements against promise structures corresponding to promises included in valid documents and generates a suspicion score based on the analysis. In turn, the knowledge manager generates a suspicious document notification corresponding to the document when the suspicion score reaches a suspicion threshold.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

Figure 1:
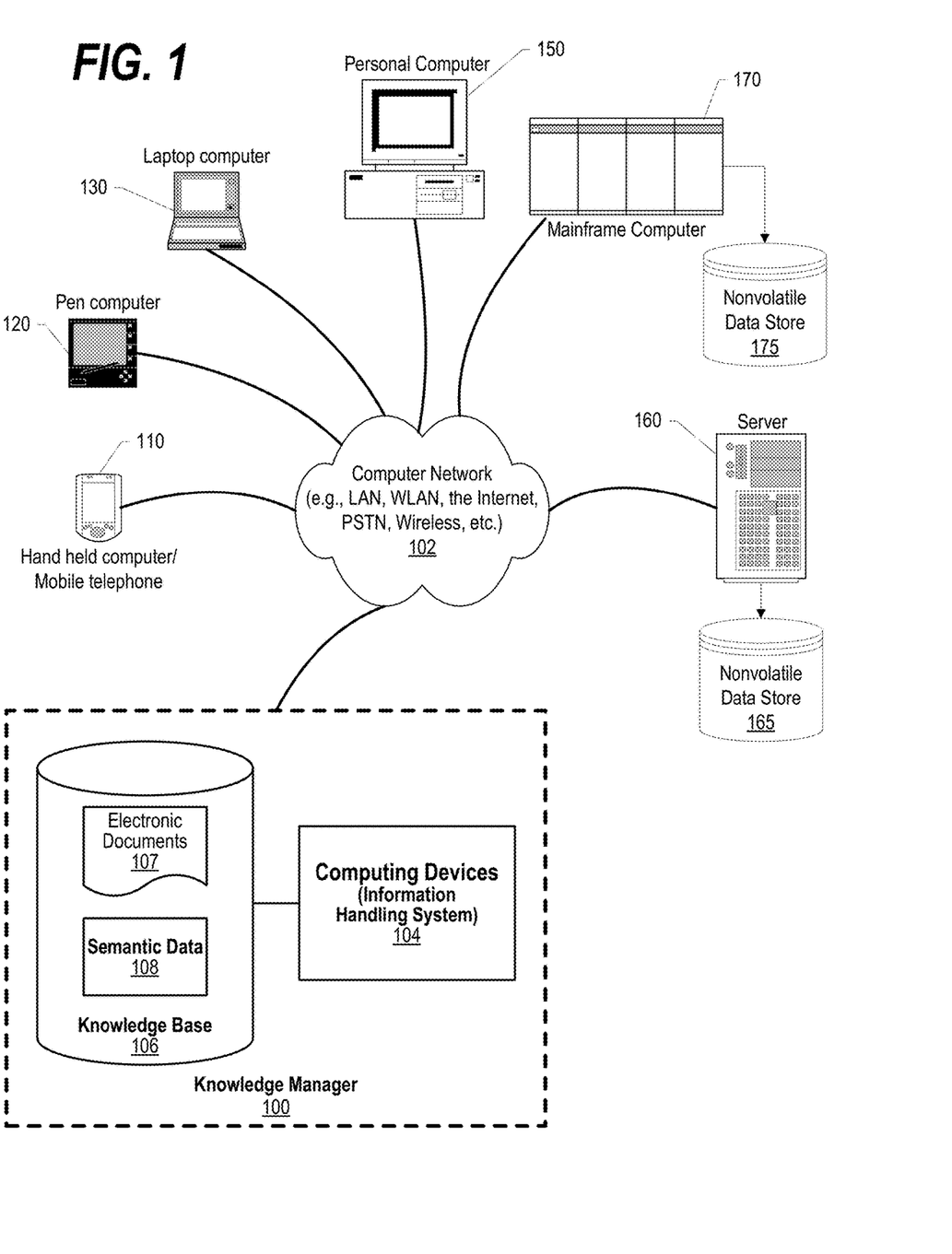
FIG. 1 depicts a schematic diagram of one illustrative embodiment of a knowledge manager system in a computer network.

FIG. 1 depicts a schematic diagram of one illustrative embodiment of a question/answer creation (QA) system 100 in a computer network 102. Knowledge manager 100 may include a computing device 104 (comprising one or more processors and one or more memories, and potentially any other computing device elements generally known in the art including buses, storage devices, communication interfaces, and the like) connected to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. Knowledge manager 100 and network 102 may enable question/answer (QA) generation functionality for one or more content users. Other embodiments of knowledge manager 100 may be used with components, systems, sub-systems, and/or devices other than those that are depicted herein.

Knowledge manager 100 may be configured to receive inputs from various sources. For example, knowledge manager 100 may receive input from the network 102, a corpus of electronic documents 106 or other data, a content creator 108, content users, and other possible sources of input. In one embodiment, some or all of the inputs to knowledge manager 100 may be routed through the network 102. The various computing devices 104 on the network 102 may include access points for content creators and content users. Some of the computing devices 104 may include devices for a database storing the corpus of data. The network 102 may include local network connections and remote connections in various embodiments, such that knowledge manager 100 may operate in environments of any size, including local and global, e.g., the Internet. Additionally, knowledge manager 100 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, the content creator creates content in a document 106 for use as part of a corpus of data with knowledge manager 100. The document 106 may include any file, text, article, or source of data for use in knowledge manager 100. Content users may access knowledge manager 100 via a network connection or an Internet connection to the network 102, and may input questions to knowledge manager 100 that may be answered by the content in the corpus of data. As further described below, when a process evaluates a given section of a document for semantic content, the process can use a variety of conventions to query it from the knowledge manager. One convention is to send a well-formed question. Semantic content is content based on the relation between signifiers, such as words, phrases, signs, and symbols, and what they stand for, their denotation, or connotation. In other words, semantic content is content that interprets an expression, such as by using Natural Language (NL) Processing. In one embodiment, the process sends well-formed questions (e.g., natural language questions, etc.) to the knowledge manager. Knowledge manager 100 may interpret the question and provide a response to the content user containing one or more answers to the question. In some embodiments, knowledge manager 100 may provide a response to users in a ranked list of answers.

In some illustrative embodiments, knowledge manager 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Types of information handling systems that can utilize knowledge manager 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 100. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
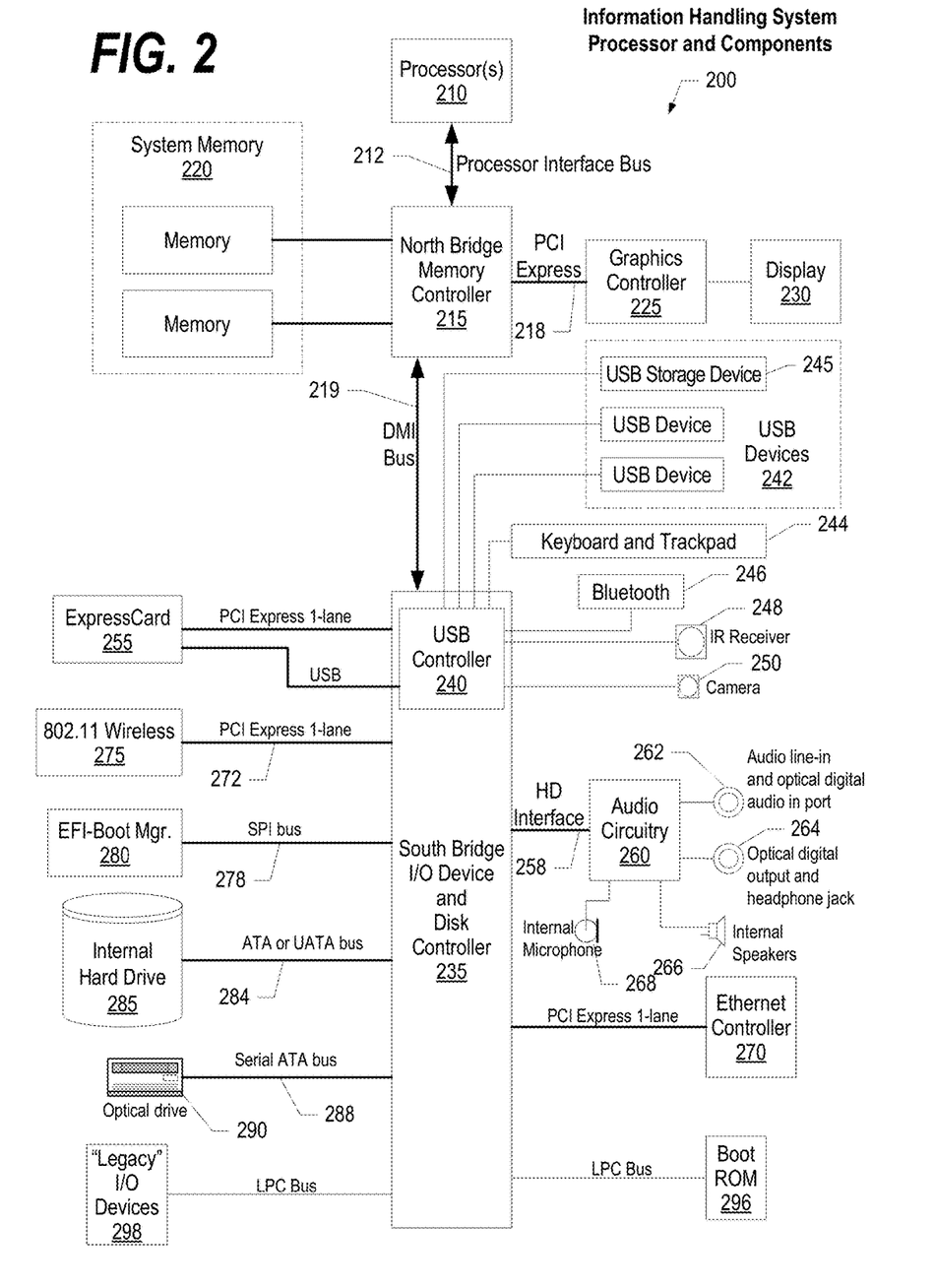
FIG. 2 illustrates an information handling system, more particularly, a processor and common components, which is a simplified example of a computer system capable of performing the computing operations described herein.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. The LPC bus also connects Southbridge 235 to Trusted Platform Module (TPM) 295. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE.802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

FIGS. 3-9 depict an approach that can be executed on an information handling system. The information handling system utilizes deep semantic analysis of privacy statements along with a trained set of malicious and valid documents to highlight and find new suspicious documents. In one embodiment, the information handling system analyzes a new document's command statement proximity, frequency and veracity against valid and malicious command statements to compute a suspicion score for the new document. In turn, the information handling system flags documents that generate a suspicion score over a suspicion threshold and highlight suspicious areas in the document accordingly.

Figure 3:
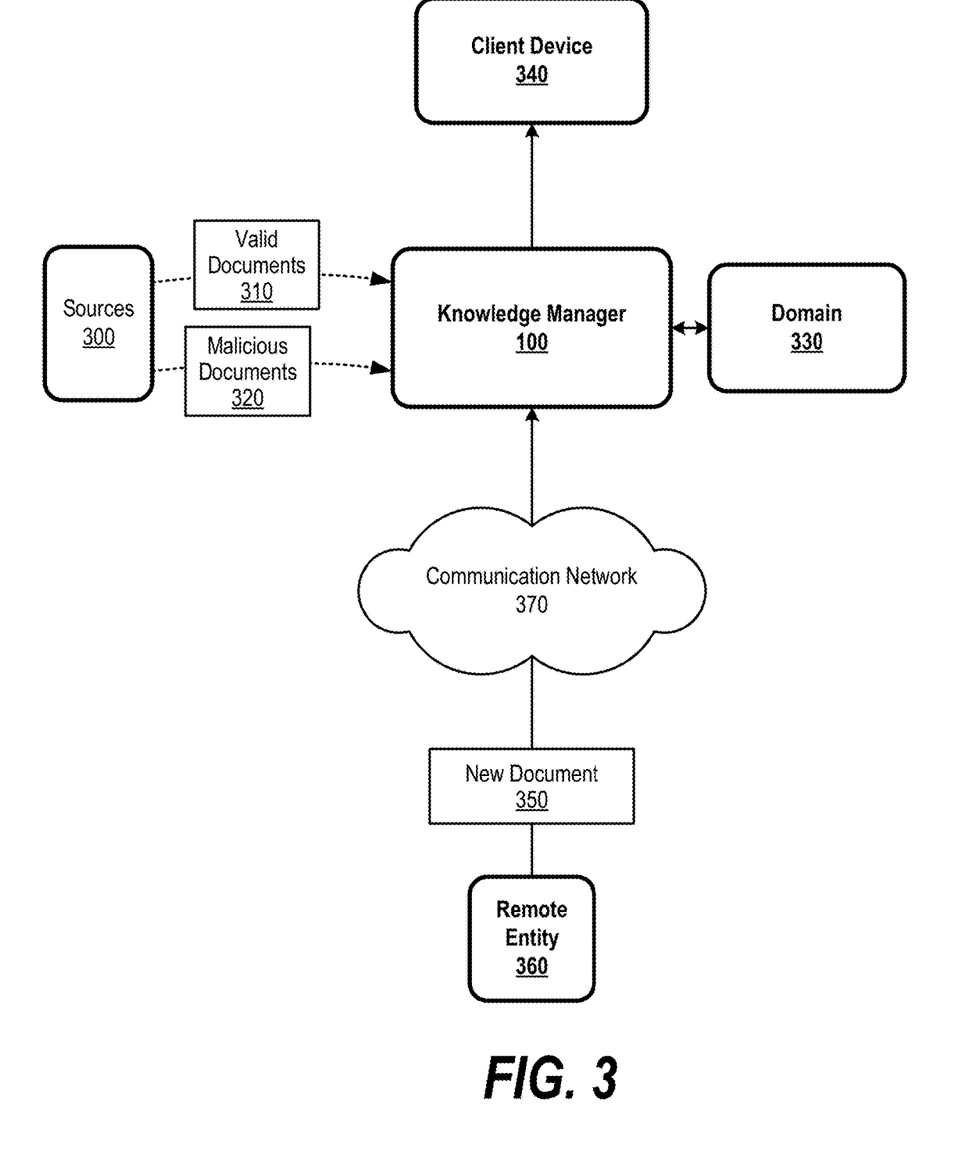
FIG. 3 is an exemplary diagram depicting a knowledge manager generating a knowledge base domain from a corpus of documents and utilizing the knowledge base domain to determine whether incoming documents from remote entities are suspicious.

FIG. 3 is an exemplary diagram depicting a knowledge manager generating a knowledge base domain from a corpus of documents and utilizing the knowledge base domain to determine whether incoming documents from remote entities are suspicious. Knowledge manager 100 ingests a corpus of documents from sources 300 that include valid documents 310 and malicious documents 320. For example, sources 300 may include banks that provide valid documents 310 such as privacy documents, banking guidelines, communication guidelines, etc. Sources 300 may also include policing agencies that provide malicious documents 320 such as known malicious emails, malicious targeting techniques, etc.

Knowledge manager 100 analyzes valid documents 310 and malicious documents 320 as coherent documents filled with sentences. In one embodiment, knowledge manager 100 uses natural language processing to understand the nature of the documents and specific passages within the documents. Knowledge manager 100 identifies promise structures, valid grammar constructs and layout constructs, malicious structures, and malicious grammar constructs within valid documents 310 and malicious documents 320, which knowledge manager stores in domain store 330. For example, knowledge manager 100 may identify a promise in one of valid documents 310 such as "We will never ask for your PIN number in an email message," which knowledge manager converts to a promise structure and stores in domain 330 (see FIG. 4 and corresponding text for further details).

Once knowledge manager 100 generates domain 330, knowledge manager 100 receives new document 350 from remote entity 360 over communication network 370. New document 350 may be an email, a text message, a word processing file, a web page, or any other text-based data received at knowledge manager 100. Knowledge manager 100 performs deep semantic analysis on new document 350 to determine new document 350's command statements proximity, frequency and veracity relative to domain 330's stored information and computes a suspicion score for new document 350 accordingly. Continuing with the example above, if new document 350 includes a command statement of "Please provide your PIN number," knowledge manager 100 assigns a high suspicion score to new document 350 because the command statement does not comply with the promise found in valid documents 310.

In one embodiment, knowledge manager 100 performs Bayesian filtering on cognitive constructs to identify active/passive voice patterns, subject-verb-object (SVO) patterns, etc. Knowledge manager 100 also determines whether a document includes domain-appropriate vocabulary. For example, if an email purports to originate from a bank, knowledge manager 100 determines whether the document includes "banker language" (language/vocabulary analysis). Knowledge manager 100 may also assess the "personalization" of a received document, such as "Dear Andrew, member *****42" versus "Dear treasured user" and score new document 350 accordingly.

When new document 350's overall suspicion score reaches a suspicion threshold, knowledge manager 100 may flag new document 350 as a suspicious document and may highlight particular areas within new document 350 that are considered a high suspicion level, such as highlighting the request "Please provide your PIN number." In turn, knowledge manager 100 sends a suspicious document notification and the document to client device 340 or may store the suspicious document in a "Suspicious Document" folder. In one embodiment, knowledge manager 100 is separate from client device 340, such as knowledge manager 100 residing on a server and client device 340 being a consumer device. In another embodiment, knowledge manager 100 resides within client device 340, such as an application executing on client device 340.

Figure 4:
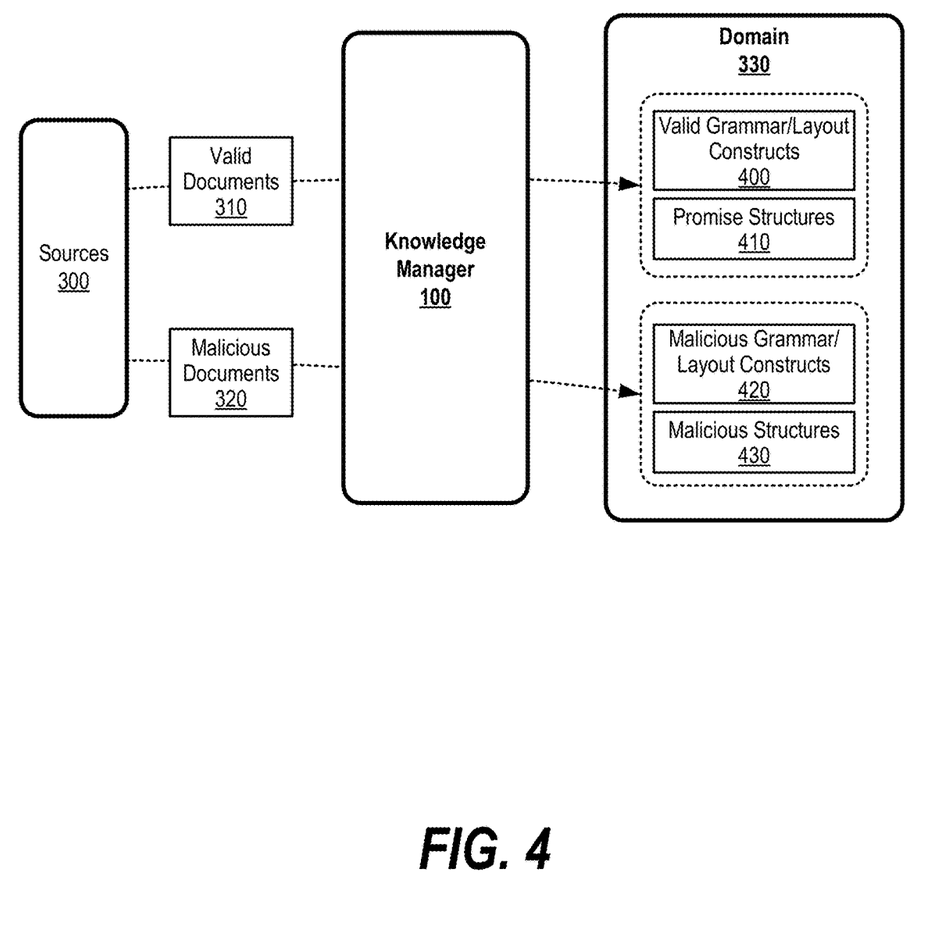
FIG. 4 is an exemplary diagram depicting a knowledge manager populating a domain with structures and constructs based upon performing deep semantic analysis on valid documents and malicious documents.

FIG. 4 is an exemplary diagram depicting a knowledge manager populating a domain with structures and constructs based upon performing deep semantic analysis on valid documents and malicious documents.

Knowledge manager 100 ingests valid documents 310 corresponding to a particular industry, such as a banking industry, and performs natural language processing techniques to identify phrases that are considered promises or agreements. In one embodiment, the identified phrases may include "Bank ABC promises to" or "Never provide your PIN number." When knowledge manager 100 identifies promises or agreements, knowledge manager 100 constructs a "promise structure" in a form such as "Type-Qualifier/Verb/Object." The type qualifier may be positive or negative based upon promises such as "never enter a password" or "always type website address." In turn, knowledge manager 100 stores promise structures 410 in domain 330.

In addition, knowledge manager 100 analyzes valid document 310's grammatical constructs and layout constructs. Grammatical constructions may be a syntactic string of words ranging from sentences over phrasal structures to certain complex lexemes, such as phrasal verbs, to the amount of active voice grammar versus passive voice grammar. Layout constructs correspond to layout attributes of valid documents 310, such as logos in headers, page numbers in footers, etc. In turn, knowledge manager 100 stores valid grammar/layout constructs 400 in domain 330.

Similarly, knowledge manager 100 ingests malicious documents 320 corresponding to the particular industry from sources 300 such as policing agencies, which provide malicious documents or guidelines for detecting malicious documents. Knowledge manager 100 performs natural language processing techniques to identify request phrases that are "malicious," such as "Please enter your PIN." When knowledge manager 100 identifies malicious phrases, knowledge manager 100 generates a "malicious structure" in a form such as "Verb/Object" (ENTER/PIN) and stores malicious structures 430 in domain 330. Knowledge manager 100 also analyzes malicious document 320's grammatical constructs and layout constructs and stores malicious grammar/layout constructs 420 in domain 330.

Figure 7:
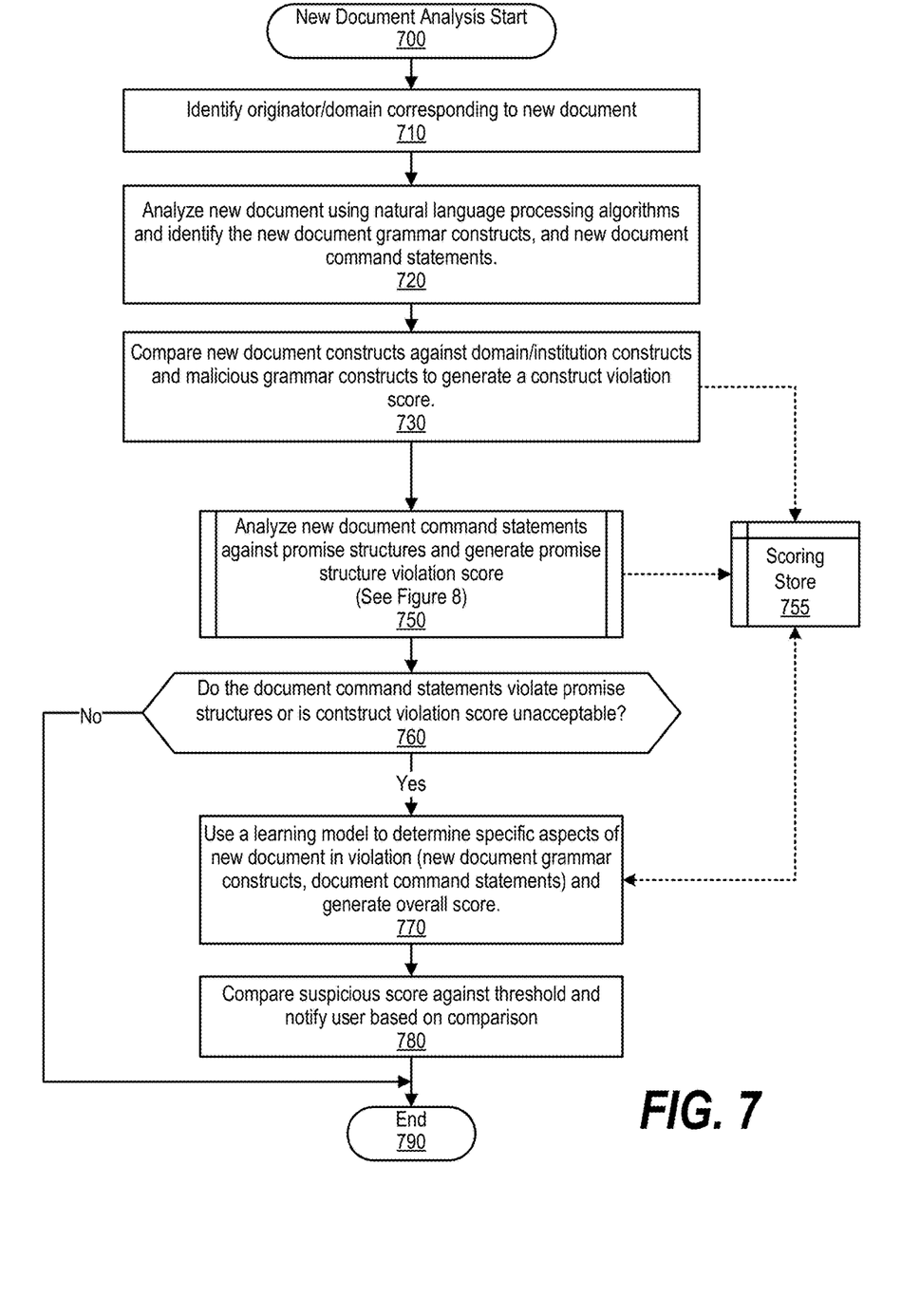
FIG. 7 is an exemplary high level flowchart depicting steps taken by a knowledge manager to compare a new document against a knowledge domain to determine whether the new document is potentially malicious.
Figure 8:
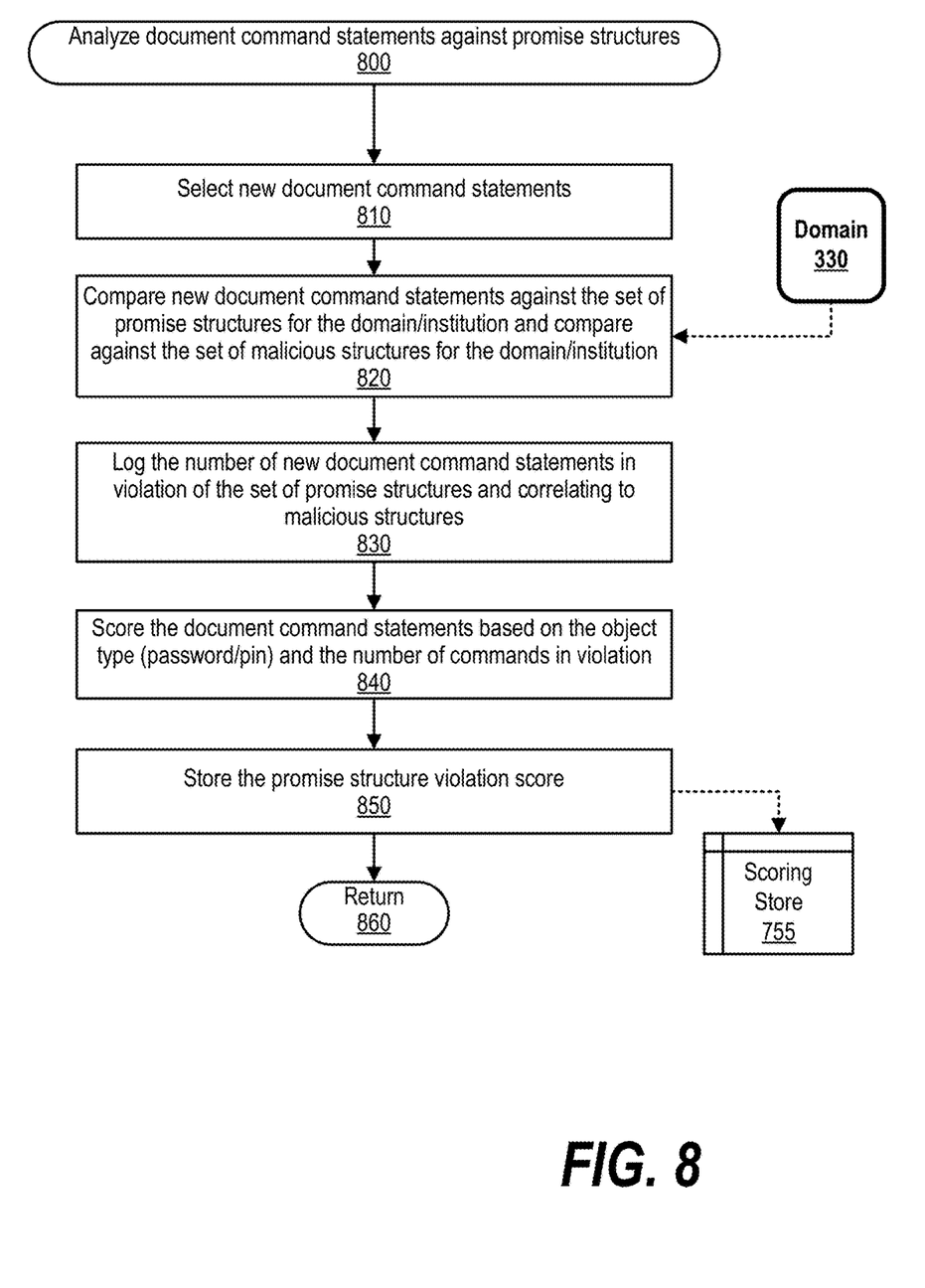
FIG. 8 is an exemplary flowchart depicting steps taken by a knowledge manager to analyze new document command statements against promise structures and malicious structures to determine whether the new document is potentially malicious.

In turn, knowledge manager 100 utilizes domain 330 to analyze new documents and assess a suspicion score of the new documents (see FIGS. 7-9 and corresponding text for further details).

Figure 5:
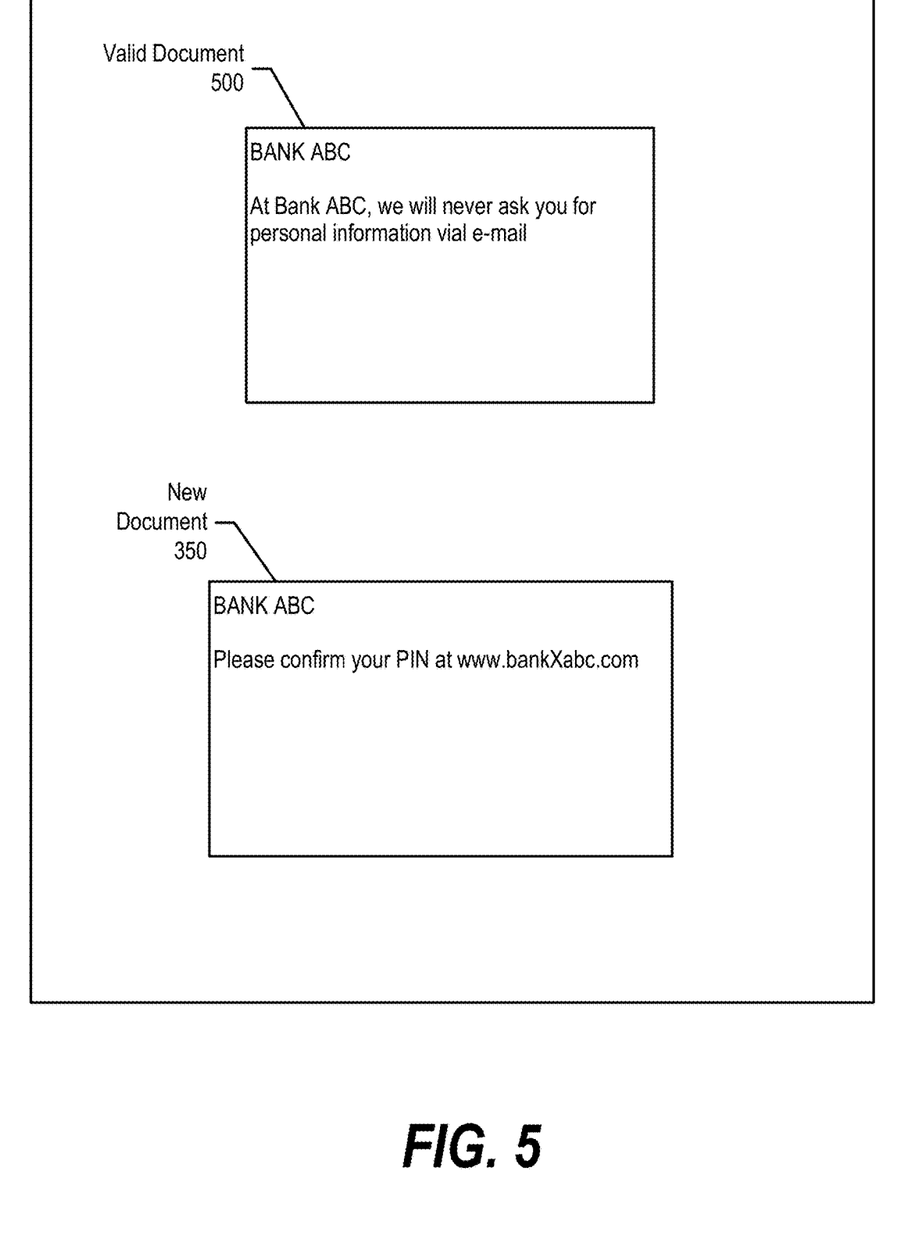
FIG. 5 is an exemplary diagram depicting examples of a valid document that includes a promise and a new document that includes a command statement that contradicts the promise in the valid document.

FIG. 5 is an exemplary diagram depicting examples of a valid document that includes a promise and a new document that includes a command statement that contradicts the promise in the valid document. Valid document 500 (part of valid documents 310) may be a policy document from Bank ABC, which includes a promise of "we will never ask you for personal information via email." As discussed earlier, knowledge manager 100 analyzes valid document 500 and stores a promise structure of "never-personal information-email" in domain 330. As such, when knowledge manager 100 receives and analyzes new document 350, knowledge manager 100 determines that the command statement of "please confirm your PIN at www.bankXabc.com" is contradictory to the promise structure corresponding to valid document 500. In turn, knowledge manager 100 computes a high suspicion score for new document 350 and may flag new document 350 as a suspicious document (see FIGS. 7, 8, and corresponding text for further details).

Figure 6:
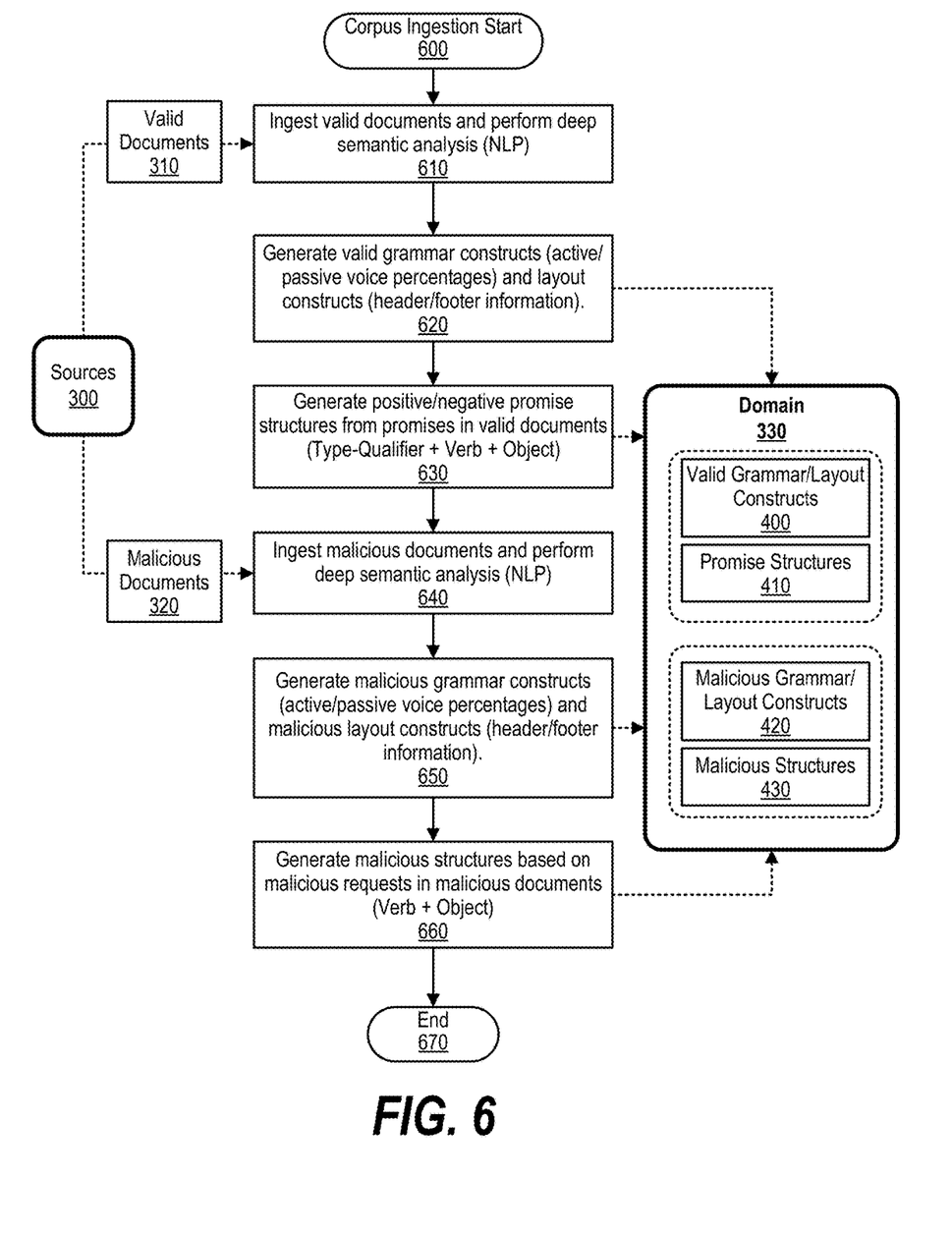
FIG. 6 is an exemplary flowchart depicting steps taken by a knowledge manager to ingest a corpus of documents and generate constructs and structures that the knowledge manager utilizes to determine whether a new document is suspicious.

FIG. 6 is an exemplary flowchart depicting steps taken by a knowledge manager to ingest a corpus of documents and generate constructs and structures that the knowledge manager utilizes to determine whether a new document is suspicious. Processing commences at 600, whereupon the process ingests valid documents 310 from sources 300 and performs deep semantic analysis on the documents to gain an awareness of their vocabulary and grammatical construction (step 610). In one embodiment, valid documents 310 may include documents such as bank privacy documents, banking guidelines, communication guidelines, etc. In another embodiment, the process utilizes natural language processing (NLP) techniques and algorithms to understand the context of valid documents 310.

At step 620, the process generates valid grammar constructs and valid layout constructs based upon the analysis, which the process stores in domain 330 (valid grammar/layout constructs 400). In one embodiment, the grammar constructs may include a percentage of the amount of active voice phrases versus passive voice phrases utilized in valid documents 310. In another embodiment, the layout constructs may indicate a page number, logo, etc. at a particular location in valid documents 310 (e.g., header, footer, etc.). In yet another embodiment, the process analyzes valid documents 310 from an overall domain perspective (e.g., banking domain) and also analyzes valid documents 310 on an institutional basis (e.g., Bank ABC, Bank DEF, etc.). In this embodiment, the process may store valid grammar/layout constructs for the overall domain as well as for individual institutions.

The process, at step 630, generates positive/negative promise structures based upon promises identified during the deep semantic analysis. In one embodiment, the process may generate promise structures in the form of "Type-Qualifier+ Verb+Object" where the type qualifier is a positive or negative qualifier (always, never, etc.), the verb is an action (ask, provide, etc.), and the object typically corresponds to personal information (e.g., PIN number, account number, etc.). For example, the process may identify a promise of "We will never ask for your PIN number" and the process may generate a negative promise structure of (NEVER+ ASK+PIN). The process stores the promise structures in domain 330 as promise structures 410.

Next, at step 640, the process ingests malicious documents 320 from sources 300 and performs deep semantic analysis on the documents to gain an awareness of their vocabulary and grammatical construction. In one embodiment, malicious documents 320 includes known malicious emails, malicious targeting documents, etc. At step 650, the process generates malicious grammar constructs and malicious layout constructs based upon the analysis, which the process stores in domain 330 (malicious grammar/layout constructs 420).

The process, at step 660, constructs positive/negative malicious structures based upon the deep semantic analysis that, in one embodiment, may be in the form of "Verb+ Object" where the verb is an action (enter, provide, etc.), and the object typically corresponds to personal information (e.g., PIN number, account number, etc.). For example, the process may store a malicious structure of (ENTER+PIN). Processing thereafter ends at 670.

Once the process generates domain 330, the process may analyze new documents (incoming or stored) using domain 330 to determine whether the new documents are potentially malicious (see FIGS. 7, 8, 9, and corresponding text for further details). In one embodiment, the process compares valid grammar/malicious constructs 400 to malicious grammar/layout constructs 420 to determine similarities and differences. For example, the process may determine that the malicious documents include a same logo at a same location as the valid documents for a particular institution, but the valid documents include a page number in the header whereas the malicious documents include a page number in the footer for the same institution. In this embodiment, the process may uses the comparison results to quickly determine whether a new document is valid or suspicious (malicious).

FIG. 7 is an exemplary high level flowchart depicting steps taken by a knowledge manager to compare a new document against a knowledge domain to determine whether the new document is potentially malicious.

Processing commences at 700, whereupon, at step 710, the process identifies an originator of the new document, such as by the "from" field in the document, logo's in the new document, or other approaches to determine the originator or at least the domain corresponding to the new document (e.g. banking domain). At step 720, the process performs deep semantic analysis of the new document using, for example, natural language processing algorithms that identify the new document's grammar constructs (e.g., active/passive voice), layout constructs (header/footer information), and new document command statements (requests) such as "Please enter PIN." In one embodiment, the process flags new document command statements that include a user as a subject.

At step 730, the process compares the new document constructs (grammar, layout, etc.) against domain and institution constructs in domain 330 to generate a construct violation score. In one embodiment, the compared constructs in domain 330 include valid grammar constructs, valid layout constructs, malicious grammar constructs, and malicious layout constructs. In another embodiment, the process may utilize a machine learning algorithm to generate a construct violation score. For example, the process may determine that expected construct percentages for a document from an institution are 90% active voice, 60% banking jargon. In this example, the machine learning algorithm determines that a first received document has 80% active voice and 70% banking jargon, and a second received document has a 50% active voice and 10% banking jargon. In this example, the process assigns a low construct violation score to the first document and a high construct violation score to the second document.

The process, at predefined process 750, analyzes command statements identified in the new document against promise structures and malicious structures included in domain 330 to determine whether the new document command statements are in violation of the promise structures or correlate with the malicious structures. For example, if a promise structure is NEVER+ASK+PIN and a new document command statement is "Please enter your PIN," the process determines that the new document is highly suspicious (See FIG. 8 and corresponding text for processing details).

The process determines whether the new document command statements violate the promise structures corresponding to the domain or institution or if the construct violation score is unacceptable (e.g., exceeding a threshold, decision 760). If the document commands do not violate the domain's or institution's promise structures and the construct violation score is acceptable, decision 755 branches to the "no" branch and indicating that the new document is valid (not suspicious). On the other hand, if the document commands violate a promise structure, decision 755 branches to the "yes" branch, indicating that the document is suspicions.

At step 770, the process uses a learning model similar to that discussed above to further analyze portions of the new document that are suspicious to generate an overall suspicion score.

At step 780, the process compares the overall suspicion score against a pre-defined suspicion threshold and notifies the user if the suspicion score reaches the suspicion threshold via a suspicious document notification. In one embodiment, the process highlights particular areas in the document that are deemed highly suspicion, such as a line that requests the user to enter bank account information when a promise structure indicates that the bank will never ask for bank account information. In one embodiment, the process analyzes the text of the new document and, if a web page link does not fit the nature of the rest of new document, the process marks the link as suspicious. FIG. 7 processing thereafter ends at 790.

FIG. 8 is an exemplary flowchart depicting steps taken by a knowledge manager to analyze new document command statements against promise structures and malicious structures to determine whether the new document is potentially malicious. Processing commences at 800, whereupon the process selects the new document command statements that the process identified in FIG. 7. At step 820, the process compares the new document command statements against the promise structures and malicious structures of the new document's corresponding domain and institution located in domain 330.

At step 830, the process logs the number of new document command statements that violate the promise structures and, in one embodiment, the number of new document command statements that correlate to the malicious structures. At step 840, the process scores the new document command statements based on the object type (password/pin) and the number of new document command statements that violate the promise structures and ones that match the malicious structures. For example, if the new document includes a new document command statement that blatantly violates a promise structure, the process generates a high violation score for the new document.

At step 850, the process stores the promise structure violation score in scoring store 755 and FIG. 8 processing thereafter returns to the calling routine (see FIG. 7) at 860.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:

performing deep semantic analysis on one or more valid documents corresponding to one or more business policies, wherein the deep semantic analysis detects one or more promises in the one or more valid documents;

generating one or more promise structures each comprising a type qualifier, a verb, and an object based on the identified one or more promises;

in response to generating the one or more promise structures, analyzing a new document received over a computer network that comprises a set of text that requests information from a user;

evaluating the set of text against the one or more promise structures;

generating a suspicion score based upon determining, during the evaluating, that the request to the user violates one or more of the promise structures;

modifying the new document by highlighting the set of text in response to determining that the suspicion score reaches a suspicion threshold, wherein the set of text in the modified document appears visually different from the set of text in the new document received over the computer network; and displaying the modified document to the user, wherein the highlighted set of text is visible to the user.

2. The method of claim 1 further comprising:

wherein the deep semantic analysis results in an identification of a document command statement corresponding to the request and one or more grammar constructs; and adjusting the suspicion score in response to comparing the one or more grammar constructs against one or more valid grammar constructs corresponding to the one or more valid documents.

3. The method of claim 2 wherein the deep semantic analysis results in one or more layout constructs corresponding to the document, the method further comprising:

adjusting the suspicion score in response to comparing the one or more layout constructs against one or more valid layout constructs corresponding to the one or more valid documents.

4. The method of claim 3 further comprising:

adjusting the suspicion score in response to comparing the one or more grammar constructs against one or more malicious grammar constructs corresponding to one or more malicious documents; and adjusting the suspicion score in response to comparing the one or more layout constructs against one or more malicious layout constructs corresponding to the one or more malicious documents.

5. The method of claim 1 wherein the set of text contradicts one of the one or more promise structures.

* * * * *